APPARATUS FOR AUTOMATICALLY COPYING LINES

Original Filed June 3, 1964 3 Sheet-Sheet 1

Inventors
DAVID SCARTH RITCHIE
THOMAS McPHERSON GLASS
By Irwin S. Thompson
Attorney

APPARATUS FOR AUTOMATICALLY COPYING LINES

Original Filed June 3, 1964 3 Sheet-Sheet 2

Inventors
DAVID SCARTH RITCHIE
THOMAS McPHERSON GLASS
By Irvin S. Thompson
Attorney

APPARATUS FOR AUTOMATICALLY COPYING LINES

Original Filed June 3, 1964 3 Sheet-Sheet 3

Inventors
DAVID SCARTH RITCHIE
THOMAS McPHERSON GLASS
By Irwin S. Thompson
Attorney United States Patent Office Re. 27,265
Reissued Jan. 11, 1972

27,265
APPARATUS FOR AUTOMATICALLY COPYING LINES

David Scarth Ritchie, Glasgow, and Thomas McPherson Glass, Edinburgh, Scotland, assignors to Barr and Stroud Ltd., and D-Mac Limited, both of Glasgow, Scotland, Great Britain, fractional part interest to each Original No. 3,323,414, dated June 6, 1967, Ser. No. 373,607, June 3, 1964. Application for reissue Aug. 13, 1968, Ser. No. 785,817
Int. Cl. B41b *13/00;* B43m *13/18*
U.S. Cl. 95—12 30 Claims

Matter enclosed in heavy brackets [ ] appears in the original patent but forms no part of this reissue specification; matter printed in italics indicates the additions made by reissue.

*ABSTRACT OF THE DISCLOSURE*

*Lines are drawn by a beam of light projected from a movable housing onto a photosensitive material. A dove prism rotates the beam according to its direction of movement, and means are provided to vary the intensity of the beam in response to variations in its velocity with respect to the photosensitive material, thereby providing correct exposure along the length of a line. The housing also carries apparatus for projecting symbols onto the photosensitive surface.*

This invention relates to apparatus for automatically drawing lines, particularly but not exclusively irregular lines, for example for cartographic purposes. The apparatus may also be used for printing symbols.

Hitherto, finished maps and charts are hand-drawn from original manuscript maps by highly skilled draughtsmen, but the finishing process is lengthy and laborious, particularly when changes between the original manuscrip and finished map are involved. Said changes may be for example, scale or projection, the insertion of dotted and parallel lines and changes in thickness and tone of line.

It is an object of the invention to obviate or mitigate the above-mentioned disadvantages.

According to the present invention we provide apparatus for automatically drawing a line, for example as on a map, in accordance with recorded data, which data may be, for example, in the form of electrically magnetized tape giving the position of each part on the line relative to co-ordinate axes, comprising means for projecting a light beam to effect a trace of the line, for example on photographically sensitised paper, and means for automatically moving the light beam relative to co-ordinate axes with components of movement corresponding, for example, to the distance of the parts of the line from the co-ordinate axes.

The apparatus may also include a facility for projecting a symbol at specific points, or a series of symbols or marks at specified points, or a series of symbols or marks at specified intervals along the trace of a line.

Preferably the means for moving the light beam includes relatively movable carriages mounted for movement mutually at right angles and electrically driven with components of movement in accordance with electrically recorded co-ordinated data. Alternatively means for moving the light spot in polar co-ordinates can be provided.

Further according to the invention the apparatus may include means to mask a portion of the light in order to provide a plurality of parallel trace lines, comprising a light transmitting element having an opaque zone of varying width thereon, said element being movable in order to bring any selected part of the opaque zone into position to mask part of the light beam and thus form spaced images of the original line.

The apparatus preferably includes a dove prism, situated in parallel light, which inverts light passed therethrough but does not change the direction of same, said prism being automatically maintained in a specific relationship with the direction of tracing by the light beam, in order to maintain the trace lines parallel. Also, there may be provided means for intermittently interrupting the trace, for example, comprising a light deflector adapted to be intermittently moved in order to deflect the light beam out of and into the tracing position.

In order to adjust the width of trace line an adjustable diaphragm preferably square in shape is positioned in the beam of light. In order to produce a variety of symbols a disc is provided carrying a number of symbols, any one of which may be introduced at a time into the projected beam. A separate means is provided to control the exposure of the symbols independenty from that of the lines.

The apparatus preferably includes control circuits to control the intensiyt of the light according to the speed of movement, control the interruption of the light beam if broken lines are required, and to ensure that the spaced beams of light are maintained at right angles to the direction of motion of the head.

An embodiment of the invention will now be described, by way of example, with reference to the accompanying drawings, in which.

Figure 1:
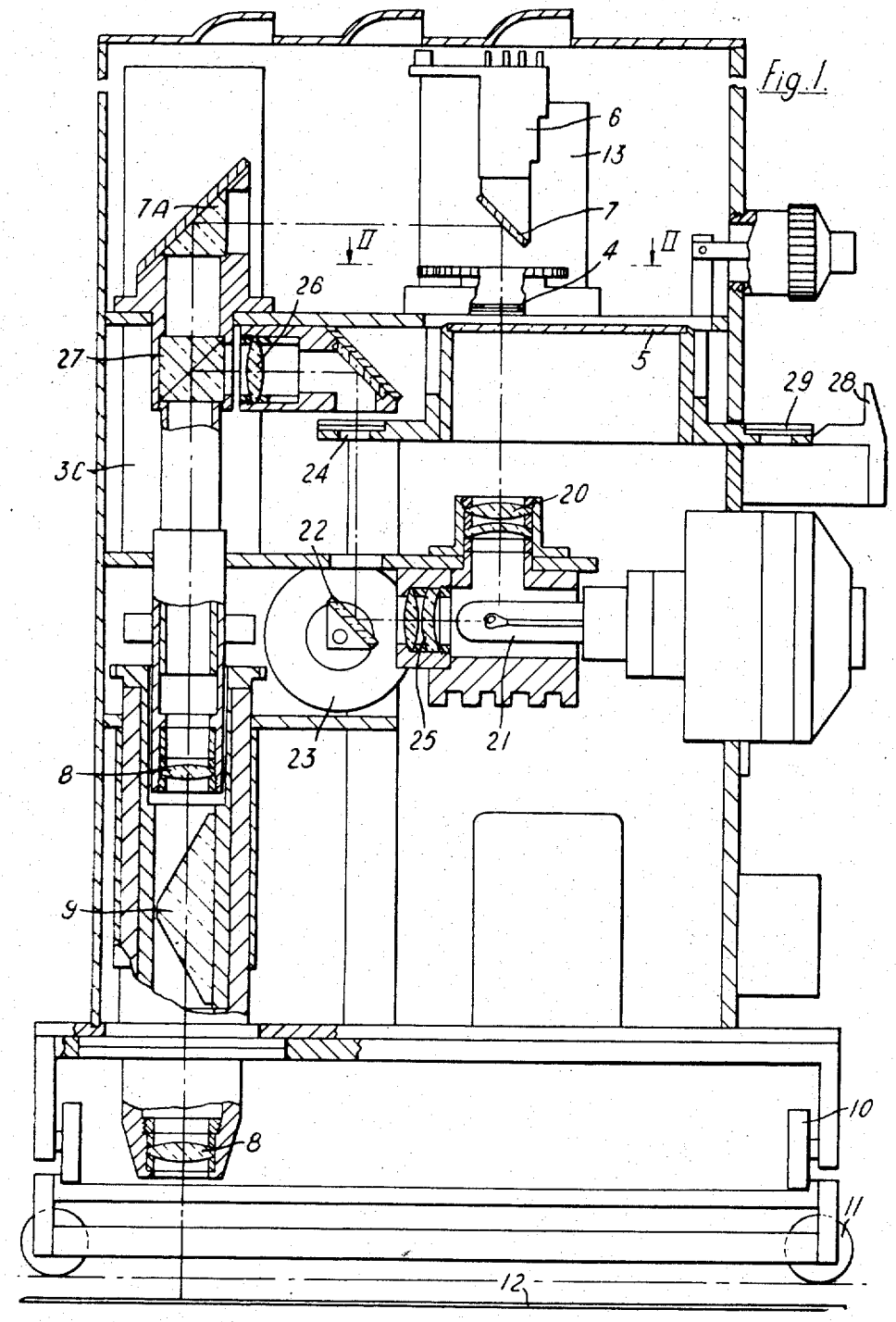
FIG. 1 is an axial sectional elevation of a projector.

Referring now to FIG. 1, reference 21 denotes a light source located in the projector, the rays emanating from which source are condensed by a lens system 20. A square diaphragm 4 (seen best in FIG. 2) is positioned co-axial with the lens system 20, and the size of the diaphragm is controlled by a servo-motor 3A housed in a casing 13.

Adjacent the diaphragm 4 is a transparent disc 5 pivotally mounted on an axis parallel to the beam of light emanating from the source 21. Marked on the surface of the transparent disc is an opaque arcuate zone 14 of varying width (FIG. 2), the disc 5 being so positioned that any part of the opaque arcuate zone may be coincident with the axis of said light beam in order partially to mask same. Rotation of this disc is manually controlled.

The beam of light is deflected through a right angle by means of a deflector 7, e.g. a plane mirror which is carried on a moving element of an electrical interruption relay 6 which relay when energised causes a small angular rotation of the moving element. This relay 6 is energised by an electric pulse generator as will be described hereinafter. The beam of light is passed from the mirror 7 via a fixed prism **[7*a*] to a projecting lens system comprising two lenses 8. Interposed between the lenses 8 is a dove prism 9 which inverts, but does not change the direction of, the light passed therethrough. The dove prism 9 is used to rotate the image of the light and is mounted for rotational movement about the axis of the reflected beam, such rotational movement being controlled by a servo-motor [3A]. The emergent ray from the projector is directed normally on to a photographically sensitised sheet 12**.

If a symbol 29 is required to be printed then an interruption relay or solenoid 23 carrying a reflector 22 is operated. A small rotation of the reflector 22 allows an image of the required symbol 29 on a disc 24 to be projected through a branch optical system, consisting of condenser 25 and projector 26, into the main optical system via a beam combining prism 27. The disc carrying the symbols is mounted on the same rotating holder s that which mounts the disc 5 carrying the opaque rcuate zone 14. Individual symbols can be manually elected and the disc registered in position by means of . spring loaded pawl 28. Means are provided for re-noving individual symbols 29 from the disc and re-lacing them with different symbols. The same light ource is used to illuminate the symbols as is used to lluminate the square diaphragm.

The projector may be mounted for translational move-nent in two directions on a gantry comprising two roller arriages 10, 11 mounted mutually at right angles, roller arriage 10 being superimposed on roller carriage 11 and eing free to move in a direction at right angles to the lirection of motion of carriage 11.

The resultant motion of the projector consists of two nutually perpendicular components of motion, which are arallel to two rectangular co-ordinate axes, and is ffected by electronic control system, the control system eing supplied with information, for example as stored n a magnetic tape or punched cards. The mutually erpendicular components of motion of the projector are lependent upon the co-ordinates of each part of the riginal line with respect to the aforesaid rectangular eference axes. Thus, the projector travels over a path n accordance with the recorded data. Control systems f this type are already known in this art, as in Patent No. 3,258,776.

In operation, light from the light source 21 is con-lensed by the condensing lens system 20 and is con-entrated at the diaphragm 4, the aperture of which is ariable within limits in order to vary the thickness f line. The light then passes through a transparent ector of the disc 5, but if a divided ray of light is re-quired in order to produce a double line, the disc is otated the required amount by hand.

The light is then deflected through a right angle, by neans of the plane mirror 7 to the projecting lens system from which the emergent ray is projected normally n to the photographically sensitised sheet 12, the pro-ecting lens system 8 being such that the dove prism s situated in parallel light. Thus as the projector moves n a predetermined path the spot or spots of light on the hotographically sensitised sheet 12 trace out the same ath leaving a photographic record of the said path.

If a dotted line is required to be formed then the lectrical interruption relay 6 is energized at short in-ervals, upon which energisation the moving element of he relay 6 is given a small angular rotation which is n turn imparted to the plane mirror 7. This causes the eflected light to be displaced and hence during the eriod when the relay is energised no light is projected n to the photographically sensitised sheet 12.

If it is required to expose a symbol 29 at specified oints, the appropriate symbol is selected and the relay 3 in the branch optical system is energised.

If the symbol or mark is required at specified intervals long the trace of a line this can be produced by energis-ng the relay at appropriate intervals to produce the ex-osure. In the latter case the marks are superimposed n the trace of the line and are maintained in the same otational relationship to the direction of the trace by he dove prism 9.

Figure 3:
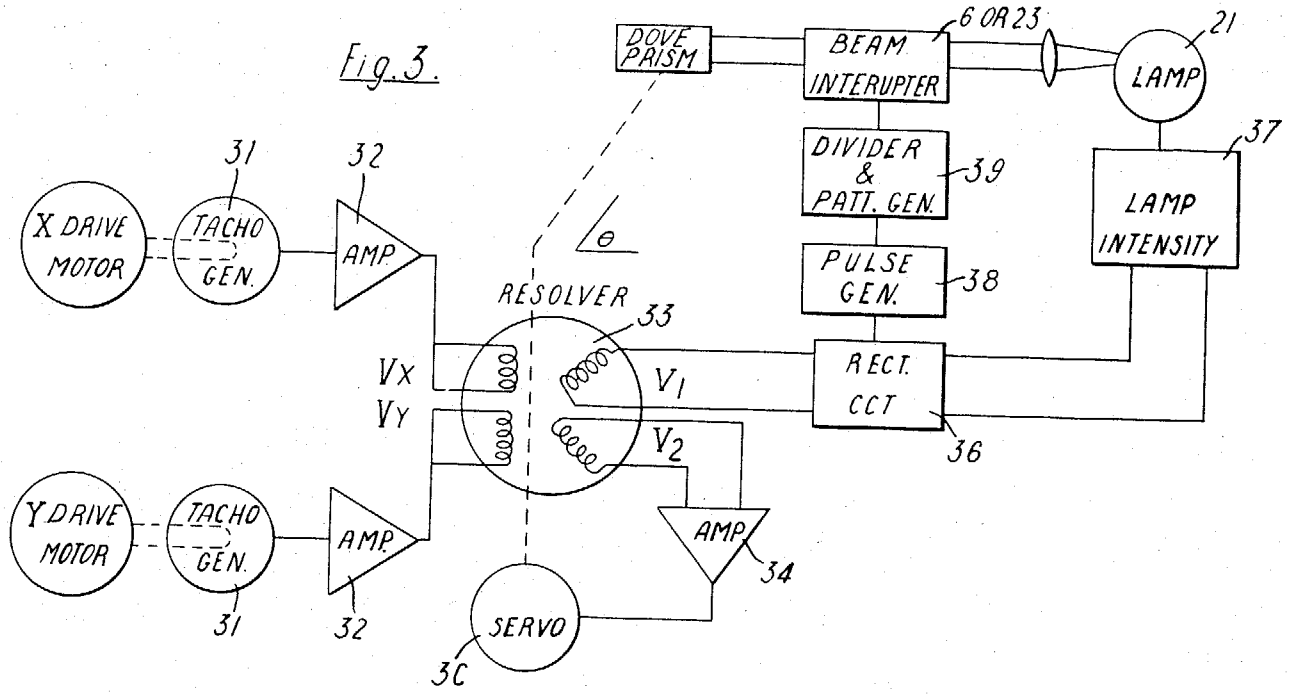
FIG. 3 is a block diagram of the control circuit.

The control of the intensity of the light source 21, eam interrupters [14] *6* and 23, and dove prism 9 is ob-ained from the rotation of tacho-generators attached o servo-motors which drive the gantry in the X and Y lirections as illustrated in FIG. 3. The outputs from lternating current tacho-generators 31 vary in amplitude s the motor speed varies and these signals are fed via solating amplifiers 32 to the rotor coils of a resolver ynchro 33. One of the stator coils supplies an amplifier 4 and servo-motor 3C which drives the rotor to the ull point. At this point the output R of the other stator oil equals $\sqrt{K(Vx^2 \pm Vy^2)}$ *where K is a constant and*

*Vx and Vy are the input voltages into the resolver 33 from X and Y tacho-generators 3 respectively.*

$$[K(Vx)^2 \pm (Vy)^2]$$

The resolver has thus changed the voltages representing the speeds of the X and Y movements from cartesian co-ordinate values into polar co-ordinate values *R and θ*. [RO]. The dove prism 9 is rotated by the shaft of the servo-motor 3C and thus aligns the spaced beams at right angles to the direction of motion of the head when drawing double lines. When drawing single lines the square image of the diaphragm is maintained with a side at right angles to the direction of tracing the line. The voltage output R is rectified in a rectifier 36 to give a D.C. voltage and the D.C. voltage is used to control the light source intensity unit 37 in such a way that the photographic recording material receives the correct exposure over the full range of speeds. A feedback system using a photoelectric cell is employed to ensure that the lamp intensity called for by the con-trol unit has been achieved. The D.C. voltage from the rectifier 36 is also supplied to a variable rate pulse generator 38. The output pulses from this generator are divided and counted by a pattern generator 39 whose output controls the interruption of the light beam by interruption relays 6. Adjustment is provided so that the counting pattern can be altered to give a variable mark/space ratio on the interrupted line being drawn, but the circuit is such that the marked lines remain appreciably constant in length independent of speed and direction of motion. The same system is used for con-trolling the exposure of symbols or marks at specified intervals to be superimposed along the length of a line trace; in the latter case the relay 23 in the secondary optical system is controlled by the output pulses from the generator.

Figure 2:
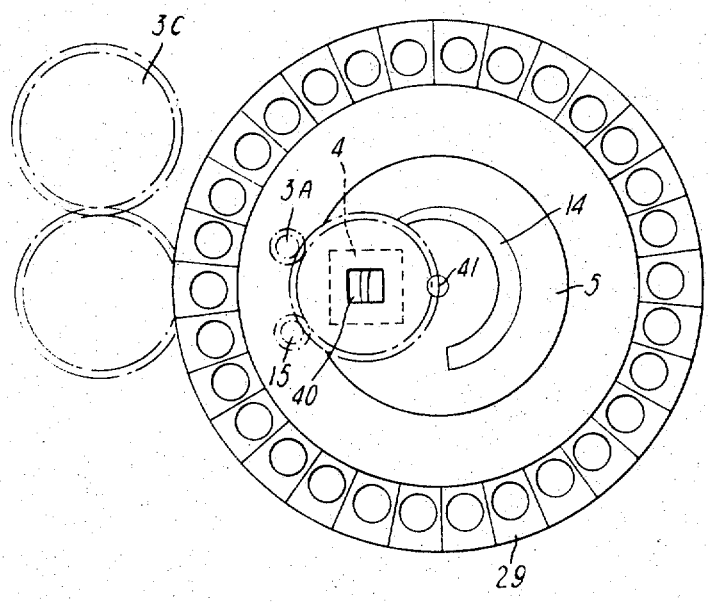
FIG. 2 is a diagrammatic sectional end view on the line II—II of FIG. 1.

Referring to FIG. 2, the diaphragm 4 has an aperture 40, the centre of which is coincident with the axis of the light beam, the size of the aperture 40 being controlled by the servo-motor 3A in conjunction with a potentiom-eter 15 or by hand. The electrical control may also be from recorded information or remotely by hand. The transparent disc 5 is pivotally mounted on an axis in-dicated at 41 which is also the centre of the mean curvature of the opaque arcuate zone 14, rotation of said disc 5 being manually controlled, but remote manual or automatic control can be added.

It is desirable that only essential equipment be in-cluded in the projector so as to keep its weight to a minimum and thus reduce its inertia when in motion.

In a modification of the invention the projector is moved in polar rather than cartesian co-ordinates.

As a result of the invention a system has been devised which is intended substantially to automate the work of drawing lines and is particularly useful for producing finished maps and charts, some advantages of the system being that, singles lines, accurately parallel spaced and dotted lines can be produced, in addition to scale and projection changes, automatically.

We claim:

1. Apparatus for producing a line trace by movement of a light beam along a predetermined path, comprising means for projecting a light beam along at least one optical axis, means for moving the light beam transverse to said axis through points whose coordinates have no regular arithmetic relationship to each other, thereby to move said axis along a bent line, and means responsive to said moving means for rotating said light beam about said axis so that said light beam maintains a fixed orientation relative to the direction of said line trace at the intersection of said axis and said line trace.

2. Apparatus as claimed in claim 1, said rotating means comprising prism means, and means for bodily rotating said prism means about said axis.

3. Apparatus as claimed in claim 2, said prism means comprising a dove prism.

4. Apparatus as claimed in claim 1, said projecting means comprising a rectangular diaphragm, said rotating means maintaining a side of the opening bordered by said diaphragm perpendicular to said direction.

5. Apparatus as claimed in claim 1, and means for disposing an opaque area within said light beam whereby said light beam projects a formed image.

6. Apparatus as claimed in claim 5, said means for disposing an opaque area comprising a transparency having thereon an opaque line of varying width, and means for moving said line perpendicular to said axis thereby to produce an image having two illuminated portions spaced by a darkened portion of predeterminable width.

7. Apparatus as claimed in claim 6, and means mounting said transparency for rotation about an axis parallel to but spaced from said optical axis, said opaque line being arcuate about said axis of rotation of said transparency.

8. Apparatus as claimed in claim 5, said disposing means comprising means for selectively positioning any one of a series of different symbols along said optical axis.

9. Apparatus as claimed in claim 8, said disposing means comprising a disc, and means mounting said disc for rotation about an axis parallel to said optical axis, said symbols being spaced arcuately about said disc.

10. Apparatus as claimed in claim 1, said projecting means comprising means for intermittently interrupting said light beam.

11. Apparatus as claimed in claim 10, said interrupting means comprising an optical element for transmitting said light beam, and means for moving said optical element to deflect the light beam.

12. Apparatus as claimed in claim 1, and means for superposing a second image on said light beam.

13. Apparatus as claimed in claim 12, said superposing means including a combining prism, one of said light beam and said second image passing through said combining prism and the other of said light beam and said second image being deflected by said combining prism along said optical axis so that said light beam and said second image leave said combining prism optically coaxial.

*14. Apparatus for producing a line trace by a light beam comprising means for projecting a light beam along an axis onto a sheet of photographic recording material, means for moving said light projecting means at varying speeds along a bent line over the photographic recording material to effect a trace of a line thereon, means for generating a signal which varies according to the speed of the light beam relative to the material and means responsive to said signal for controlling the intensity of the light beam according to the speed of the light projecting means to provide correct exposure of the photographic recording material throughout the movement of the light projecting means at the varying speeds.*

*15. Apparatus according to claim 14 wherein the projecting means includes an opaque member with a transparent area which provides a light-transmitting zone in the path of light passing to the photographic recording material, and means for changing the size of the light-transmitting zone aligned with the beam in order to change the size of the beam striking the photographic recording material.*

*16. Apparatus according to claim 15 having a condenser lens in the path of light leading to the opaque member.*

*17. Apparatus according to claim 14 having a first carriage supporting the projecting means for movement in one linear direction parallel to the photographic recording material, and a second carriage supporting the first carriage and the projecting means for movement in another linear direction which is perpendicular to the one linear direction and parallel to the photographic recording material.*

*18. Apparatus according to claim 17 wherein the projecting means also includes an opaque carried having a plurality of different transparent symbols thereon, means supporting said carrier for movement to select any one of said symbols, and means for directing light through the selected one of said symbols and onto the photographic recording material.*

*19. Apparatus according to claim 17 having means for varying the cross sectional area of the light beam.*

*20. Apparatus for drawing with light on a photographic recording material comprising, means for producing a line trace by moving a light beam in a path over photographic recording material; symbol projecting means comprising an opaque carrier having a plurality of different transparent symbols, means supporting said carrier for movement to select any one of said symbols, and means for projecting a light beam through a selected one of the symbols and onto the photographic recording material to create an image of the selected one of said symbols on the photographic recording material, said apparatus having a first carriage supporting the symbol projecting means for movement in one linear direction parallel to the photographic recording material, and a second carriage supporting the first carriage and the symbol projecting apparatus for movement in another linear direction which is perpendicular to the one linear direction and parallel to the photographic recording material.*

*21. Apparatus according to claim 20 wherein the carrier is supported for rotational movement, and the symbols are circumferentially spaced apart on the carrier.*

*22. Apparatus according to claim 21 having an optical condenser in the path of light leading to the carrier.*

*23. Apparatus according to claim 20 wherein the means for producing a line trace includes means for controlling the intensity of the light beam according to the speed of the optical head to provide correct exposure of the photographic recording material.*

*24. Apparatus according to claim 20 wherein the moving light beam which forms a line trace and the light beam which creates an image of the selected one of the symbols are projected on the photographic recording material by a common projection lens means.*

*25. Apparatus according to claim 1 having means for controlling the intensity of the light beam according to the speed of the light beam along said predetermined path to provide correct exposure of the photographic recording material.*

*26. Apparatus for producing a line trace by a light beam, comprising*

*means for holding a sensitized sheet,*

*means for projecting a light beam along an axis onto a sheet of sensitized photographic recording material held on said holding means,*

*means for effecting relative movement between said light projecting means and said holding means at varying speeds to effect a predetermined line trace on the photographic recording material, said relative movement being the resultant of movements respectively confined to first and second mutually-perpendicular linear directions which lie parallel to the recording material,*

*means for deriving first and second signals respectively indicative of the speed of said movements along said first and second directions,*

*signal-combination means for changing said signals into a single combined signal which represents the vector sum of the first and second signals, and*

*means for varying the intensity of the light beam in response to the combined signal to provide correct exposure of the photographic recording material.*

*27. Apparatus according to claim 26 wherein first and econd carriages are provided to confine said movements espectively to said first and second linear directions, said peed derivation means provides signals indicative of the peeds of each of said first and second carriages, and said ignal-combination means in a resolver.*

*28. Apparatus according to claim 27 wherein the first arriage supports the projecting means and the second arriage supports the first carriage.*

*29. Apparatus according to claim 26 wherein the pro- ecting means also includes an opaque carrier having a lurality of different transparent symbols thereon, means upporting said carrier for movement to select any one of aid symbols, and means for directing light through the elected one of said symbols and onto the photographic ecording material.*

*30. Apparatus according to claim 26 including means esponsive to the means for effecting relative movement o rotate said light beam about said axis so that said light eam maintains a fixed orientation relative to the direc- ion of said line trace at the intersection of said axis and aid line trace.*

References Cited

The following references, cited by the Examiner, are of record in the patented file of this patent or the original patent.

UNITED STATES PATENTS

| | | | |
|---|---|---|---|
| 1,149,490 | 8/1915 | Bagge | 95—4.5 |
| 3,004,469 | 10/1961 | Broyer | 88—24 |
| 3,103,849 | 9/1963 | Wise | 88—24 |
| 3,247,761 | 4/1966 | Herreman | 95—12 |
| 3,041,932 | 7/1962 | Kilminster | 355—20 |
| 3,116,661 | 1/1964 | Holland | 95—4.5 |
| 3,169,458 | 2/1965 | Wilson | 95—4.5 |
| 3,458,253 | 7/1969 | Hansen | 355—19 |

FOREIGN PATENTS

| | | | |
|---|---|---|---|
| 834,025 | 5/1960 | Great Britain | 355—20 |

JOHN M. HORAN, Primary Examiner

U.S. Cl. X.R.

95—12